W. J. CUNNINGHAM.
VEHICLE WHEEL.
APPLICATION FILED DEC. 16, 1910.
1,016,673.
Patented Feb. 6, 1912.
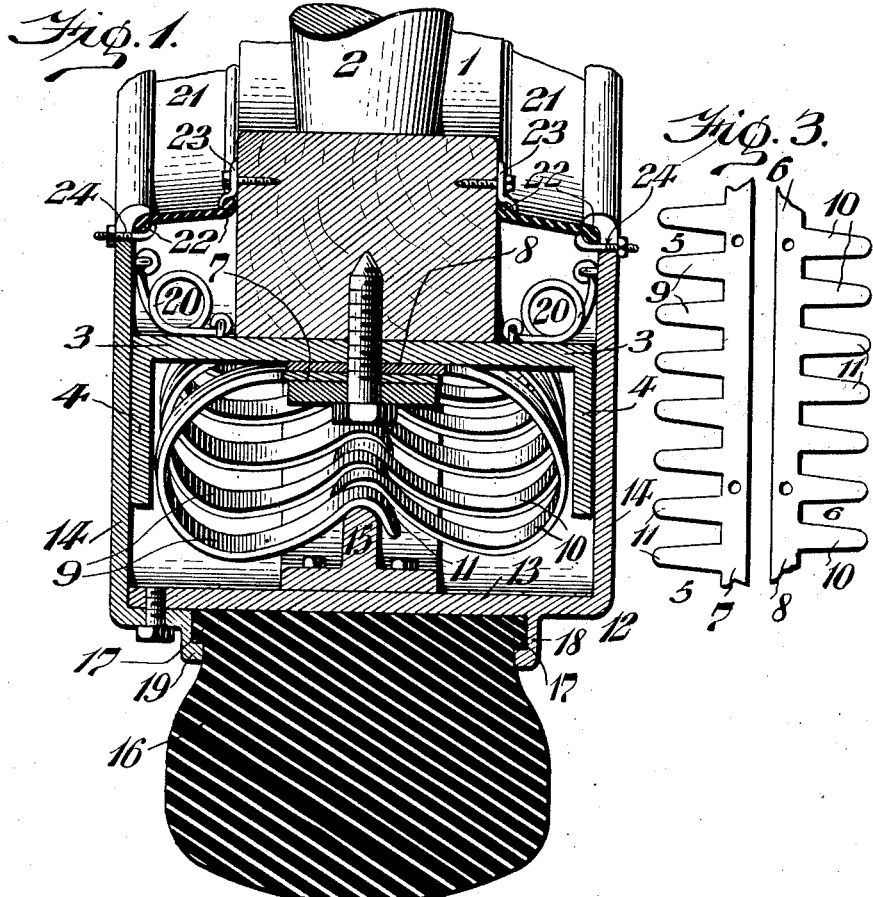
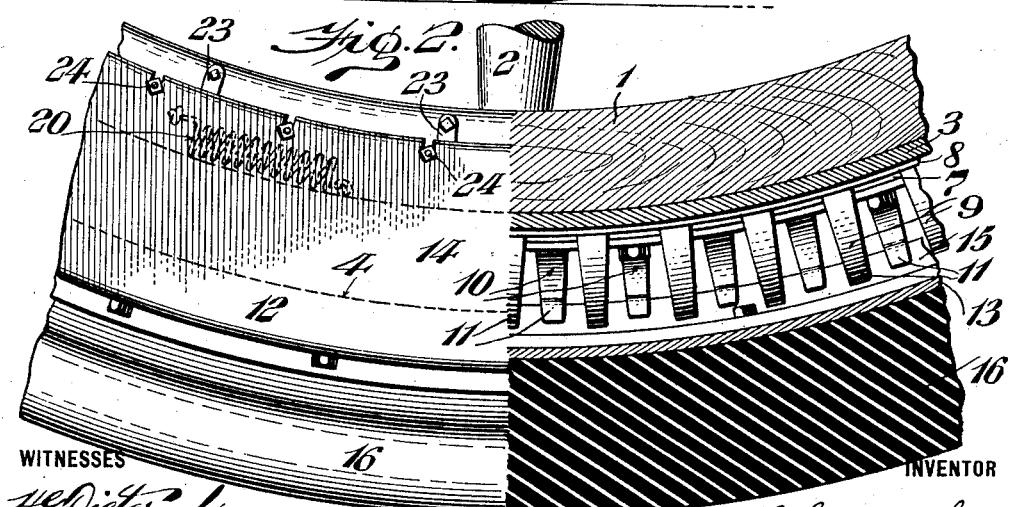
WITNESSES
H. L. Dieterich
L. Douville
INVENTOR
William J. Cunningham.
By Wiedersheim & Fairbanks,
ATTORNEYS

UNITED STATES PATENT OFFICE.

WILLIAM J. CUNNINGHAM, OF PHILADELPHIA, PENNSYLVANIA.

VEHICLE-WHEEL.

1,016,673.      Specification of Letters Patent.      Patented Feb. 6, 1912.

Application filed December 16, 1910. Serial No. 597,632.

*To all whom it may concern:*

Be it known that I, WILLIAM J. CUNNINGHAM, a citizen of the United States, residing in the city and county of Philadelphia, State of Pennsylvania, have invented a new and useful Vehicle-Wheel, of which the following is a specification.

My invention relates to a new and useful vehicle tire and consists of a tread member, supported by springs suitably carried by the felly of the wheel and said springs having a seat formed at their outer portion.

It further consists of a series of springs suitably supported, the ends of said springs being formed with depressions serving as a seat, for supporting the tread member.

It further consists in providing a series of springs seated in a channel and a tread member connected with a movable frame and supported upon said springs, said frame inclosing said channel.

It further consists of novel features of construction all as will be hereinafter set forth.

Figure 1 represents a sectional view of a vehicle tire embodying my invention, showing the felly and portion of a spoke. Fig. 2 represents a partial side elevation and partial section of a portion of said wheel. Fig. 3 represents, on a smaller scale, a plan view showing in flattened position, the springs employed and the relation of one series of springs with respect to the other.

Similar numerals of reference indicate corresponding parts in the figures.

Referring to the drawings: in a vehicle tire it is necessary to provide a suitable amount of resiliency without detracting from the strength and it is further of advantage to provide a solid tread or one which cannot be punctured or easily injured. My invention is designed to accomplish these results and in the drawing I have shown one embodiment of my invention which is at present preferred by me, but it will be evident that the arrangement of the parts may be varied, other instrumentalities may be employed and changes may be made in the construction, which will come within the scope of my invention and I do not therefore, desire to be limited in every instance to the exact form as herein shown and described.

1 designates the felly or rim of a vehicle wheel to which are connected the spokes, a portion 2 of one of which is here shown.

Suitably connected to the felly or rim 1 is a plate 3 having the flanges or sides 4, which parts from a channel. Connected to the felly or rim in any suitable manner are in the present instance the two series of springs 5 and 6. These series I have here shown as formed of continuous bands 7 and 8 from which respectively project, at suitable intervals, the members 9 and 10, forming the series. The bands are preferably connected at substantially the center of the felly or rim to the plate 3 whereby the series of springs 5 and 6 are seated within the channel and with the members 9 and 10 extending in opposite directions from the point of connection and curving away from the rim with their ends downwardly curved and interfitting or staggered, each having a depression thus forming a seat which is continuous around the wheel.

12 designates a frame formed of face plate 13 and the side members 14, one of which is removably connected to said face plate 13 and said side members being adapted to seat the flanges 4 and slide thereon. In the present instance I have provided on the inner side of the face plate 13, a continuous ridge or lug, 15 which is adapted to be secured and rest in the seats 11 in order to resiliently support the frame 12 and parts carried thereby.

16 designates the tread member formed of any suitable material, here shown as of rubber which member is carried by the frame 12 and in the present instance the tread is provided with lugs 17 engaged by shouldered lugs 18 and 19 carried by the frame 12, one of which, 18, in the present instance is carried by the face plate 13 and the other of which, 19, is carried by the side member 14, for insertion and removal of the tread. By this means it will be understood that the tread member 16 through the frame 12 is resiliently supported by the series of springs 5 and 6 and is carried by the ridge 15, in the seats 11. The entire frame and tread moves upon the wheel, giving the desired resiliency and flexibility which provides the desired strength and obviating the puncturing of the tire, it being noted that the sides 4 of the channel serve to guide the tread carrying frame in its movement.

In order to prevent improper or creeping movement of the frame I have resiliently connected the said frame with the rim 1, through the medium of the plate 3, by means of suitable springs 20, located at proper intervals around the wheel, one end of each spring being attached to the frame 12 and the other end to the plate 3, whereby a certain play between the parts is permitted to provide for undue strains but improper movement is prevented.

As will be noted by reason of the construction of the frame and channel the parts are dust and dirt proof but I prefer to further protect the parts and prevent dirt and dust from passing between the moving parts by providing a sheet of suitable material, such as strips of rubber, between the side members 14 and the rim 1. 21 designates the strips, an edge of each of which is connected to the rim 1 and the other edge of each is connected to the side members 14 by any suitable means. As shown, I have formed enlargements 22 at each edge of the strips, and I attach catches 23 on each side of the rim 1 which catches are formed to engage with the enlargements on the inner edge of the strips and I preferably curve the inner edges of the side members 14 and I provide the curved catches 24 passing through suitable slots or openings in the side members whereby the enlargements at the outer edges of the strips are seated in the curve on the side members 14 and held there by the catches 24 any number of which may be employed. By means of the strips 21 I inclose all the working parts and suitable movement of the parts is permitted as will be evident.

Having thus described my invention, what I claim as new and desire to secure by Letters Patent, is:—

1. In a device of the character stated, a rim, a channel member carried thereby, a series of spring members seated in and connected with said channel member, the ends of said members interfitting and depressed to form a seat, a tread member, a frame carrying said tread member, a lug on said frame located in said seat, said channel guiding said frame in its movement and serving as a stop therefor, resilient means for connecting said frame and rim and resilient strips connected with said rim and the sides of said frame.

2. In a device of the character stated, a rim, a channel member secured to said rim, a frame having telescopic connection with said channel member, a tread on said frame, a circumferential lug carried by said frame, and two series of oppositely disposed springs mounted on said channel member, each series consisting of a plurality of spring strips and each strip describing one curve and the free end reversely curved to form a seat in which said lug is seated.

3. In a device of the character stated, a rim, a channel member carried thereby, a series of spring members seated in and connected with said channel member, each describing one curve and the ends of said members interfitting and reversely curved to form a seat, a tread member, a frame carrying said tread member, a lug on said frame carried in said seat, said channel guiding said frame in its movement and serving as a stop therefor, and resilient strips connected with said rim and the sides of said frame.

WILLIAM J. CUNNINGHAM.

Witnesses:
C. D. McVay,
E. B. Morris.

---

Copies of this patent may be obtained for five cents each, by addressing the "Commissioner of Patents, Washington, D. C."